US012686089B2

(12) United States Patent
Maurer et al.

(10) Patent No.: US 12,686,089 B2
(45) Date of Patent: Jul. 21, 2026

(54) STEADY REST

(71) Applicant: SMW-Autoblok Spannsysteme GmbH, Meckenbeuren (DE)

(72) Inventors: Eckhard Maurer, Oberteuringen (DE); Tobias Schneider, Kressbronn (DE)

(73) Assignee: SMW-Autoblok Spannsysteme GmbH, Meckenbeuren (DE)

( * ) Notice: Subject to any disclaimer, the term of this patent is extended or adjusted under 35 U.S.C. 154(b) by 489 days.

(21) Appl. No.: 18/218,179

(22) Filed: Jul. 5, 2023

(65) Prior Publication Data

US 2024/0009786 A1 Jan. 11, 2024

(30) Foreign Application Priority Data

Jul. 6, 2022 (EP) ..................................... 22183451

(51) Int. Cl.
| | |
|---|---|
| *B23B 13/12* | (2006.01) |
| *B23Q 1/76* | (2006.01) |
| *B23Q 11/12* | (2006.01) |

(52) U.S. Cl.
CPC ............ *B23Q 1/763* (2013.01); *B23B 13/126* (2013.01); *B23Q 1/76* (2013.01); *B23Q 11/127* (2013.01)

(58) Field of Classification Search
CPC ......... B23B 13/126; B23B 13/12; B23Q 1/78; B23Q 1/76; B23Q 1/012; B23Q 11/127; Y10T 82/2593; Y10T 82/2597
See application file for complete search history.

(56) References Cited

U.S. PATENT DOCUMENTS

| | | | | |
|---|---|---|---|---|
| 3,834,256 A | * | 9/1974 | Abbatiello | ............. B23Q 15/02 |
| | | | | 82/134 |
| 10,239,169 B2 | * | 3/2019 | Maurer | .................... B23Q 1/76 |
| 2009/0001643 A1 | | 1/2009 | Rehm | |

FOREIGN PATENT DOCUMENTS

| | | | | |
|---|---|---|---|---|
| CN | 111730366 A | * | 10/2020 | ........... B23Q 11/127 |
| CN | 113977304 | | 1/2022 | |
| DE | 3719103 A1 | * | 12/1988 | ............... B23Q 1/76 |
| DE | 102007025924 | | 7/2008 | |
| KR | 101729894 B1 | * | 4/2017 | ............. B23Q 1/012 |
| SE | 1175652 A | * | 8/1985 | ............... B23Q 1/76 |

* cited by examiner

*Primary Examiner* — Nicole N Ramos
(74) *Attorney, Agent, or Firm* — Collard & Roe, P.C.

(57) ABSTRACT

It is already known to detect the position of a pressure element of a steady rest, by means of which its angle levers are actuated, via a traction cable and its rolling position. Possible penetration of liquid via openings in the housing, present for functioning, is avoided by applying sealing air which generates a positive pressure in the housing. After operation, however, penetrated or penetrating liquid could damage the coiling device of the traction cable and impair the position detection.

The present invention is intended to provide the option to provide a more accurate and simpler detection of the position of the pressure element, and thereby further alleviate the problem of penetrating liquid. This is achieved by use of a distance sensor that detects the position of the pressure element and is drained via a drain hole. During operation the drain hole is closed via a sealing air-actuated discharge valve, so that during operation the sealing air cannot escape through the drain hole, but in the rest state, any liquid that has still penetrated drains off.

9 Claims, 2 Drawing Sheets

STEADY REST

REFERENCE TO PENDING PRIOR PATENT APPLICATION

This patent application claims benefit of European Patent Application No. 22 183 451.8, filed Jul. 6, 2022, which patent application is hereby incorporated herein by reference.

FIELD OF THE INVENTION

The present invention relates to a steady rest for holding a workpiece on a machine tool, comprising an essentially perpendicularly disengageable actuating piston which is flanked by an angle lever on both sides, and which within a housing cooperates with the angle levers via a pressure element, a sealing air supply for avoiding penetration of liquid being associated with the housing.

BACKGROUND OF THE INVENTION

Such a steady rest is already known from DE 10 2007 025 924 B3. As a distance sensor for detecting the position of the pressure element, and thus for controlling the clamping position of the steady rest, this prior publication provides a traction cable that can be rolled and unrolled by use of a stationary coiling device. Position detection takes place with regard to the rotational position of the coiling device, which may be tapped via a potentiometer. The particular clamping position of the actuating piston may be deduced as a function of a resistance measured at the potentiometer.

A steady rest is made up of three holding elements that approach a workpiece, to be clamped, from three sides. Within the scope of a clamping operation, the actuating piston is disengaged, and has a middle holding element that approaches the workpiece from its bottom side. An angle lever that is mounted so as to be rotatable about a swivel axis is provided on both sides of the actuating piston, and may be moved from an open position into a closed position by lifting the pressure element that is connected to the actuating piston. For this purpose, the pressure element has rolling surfaces on which rolling means are supported on ends of the angle levers situated in the housing, and via which the angle levers are deflectable as a function of the clamping position of the actuating piston.

The coiling device for the traction cable is situated outside the housing in which the actuating piston cooperates with the angle levers. Spray water, such as cooling lubricant, that is provided within the scope of the machining of the workpiece may enter the housing. Although the traction cable is not led out of the housing at a lowest point, it has been shown that liquid flows out downwardly from the housing along the traction cable and penetrates into the coiling device, permanently damaging it.

SUMMARY OF THE INVENTION

Against this background, the object of the present invention is to propose a steady rest for holding a workpiece, which allows precise position detection but avoids damage and impairment from penetrating liquid to the greatest extent possible.

This object is achieved by a steady rest for holding a workpiece according to the features of independent claim 1. Useful refinements of such a steady rest may be inferred from the subsequent dependent claims.

According to the invention, a steady rest for holding a workpiece on a machine tool is provided, comprising an essentially perpendicularly disengageable actuating piston which is flanked by an angle lever on both sides, and which within a housing cooperates with the angle levers via a pressure element, a sealing air supply for avoiding penetration of liquid being associated with the housing. Such a steady rest differs from the previously known prior art in that a disengaged position of the pressure element is detectable by means of a distance sensor that is associated with the housing, below a lowest position of the pressure element, and a run-up cavity of the distance sensor for draining the distance sensor has a drain hole that is closeable via a sealing air-actuated discharge valve. This has the advantage that during operation of the machine tool, i.e., during the time that liquid may arise, the housing is acted on by a sealing pressure, preferably a positive pressure in the range of 0.5 to 1.0 bar, which keeps the liquid from penetrating into the housing. If the sealing air is switched off after operation, although liquid possibly still present may penetrate into the housing, it will collect at a lowest point where it can be drained off. Such a lowest point may represent, for example, the position of the distance sensor, since it must still be situated below the lowest movement position of the pressure element to allow the entire travel path of the pressure element to be detected.

The run-up cavity of the distance sensor, which on the one hand allows an accurate measurement of the position of the pressure element and on the other hand may be shielded toward the housing in a liquid-tight manner, may be used as a collecting basin into which liquid that arises may flow. This liquid will then flow off via the drain hole, thus ensuring that no liquid is present in front of the distance sensor.

A distinction is to be made between a rest situation and an operating situation. In the rest situation, liquid that arises may flow into the run-up cavity. The run-up cavity may advantageously, but does not have to, represent an absolute low point of the housing cavity. Further outlets may be provided at lower points. In the unpressurized state, i.e., when no sealing air is applied, the drain hole is opened up by the discharge valve so that the liquid may flow out of the run-up cavity.

In contrast, in the operating situation sealing air is introduced into the housing, and a positive pressure is thus generated in the housing. At the same time, the sealing air with its pressure is applied at the discharge valve and thus activates it. Thus, the sealing air cannot escape through the drain hole, and the sealing air ensures that no liquid penetrates into the housing. In particular, the run-up cavity is kept open so that measurements by the distance sensor are not impaired.

In one specific refinement, it may be provided that the distance sensor is oriented in parallel to the actuating piston, and the pressure element has a reflective surface, opposite from the distance sensor, for reflecting a distance signal emitted from the distance sensor. Such a design allows a contact-free detection of the distance between the distance sensor and the pressure element, using various types of sensors. It should preferably be ensured that the reflective surface is aligned and designed specifically so that a signal emitted from the distance sensor is reflected back to the distance sensor, and the reflection strikes it there with sufficient intensity.

With regard to the design of the discharge valve, a spring-actuated blocking piston, which in an unpressurized state opens up the drain hole, may be associated with the discharge valve. The blocking piston may have a widening on the head side, with a compression spring situated between this widening and a stop surface. Actuation of the blocking piston may then take place only against the force of the compression spring.

A separate sealing air connection may preferably be associated with the blocking piston on an actuation side. Via this separate sealing air connection, an air supply may be provided which allows the blocking piston to engage in the drain hole, against the elastic force of the compression spring, in order to close the drain hole, preferably in an air-tight manner. This has the advantage that a sufficient pressure for actuating the discharge valve may be ensured due to the separate air connection.

Alternatively, however, the blocking piston may be connected on its actuation side to a housing part that is acted on by sealing air. This likewise requires the valve to be acted on by sealing air, but not necessarily via a separate line.

The distance sensor, the run-up cavity, the drain hole, and the discharge valve may be accommodated with some advantage in a drainage housing that is detachable from the housing. This allows simple exchange of the position detection system by replacing the entire assembly. A possible error may thus be eliminated more easily.

At least one sealing air connection at one at least local geodetic low point of a housing cavity formed in the housing may preferably be associated with the housing. Since liquid collects at the lowest points due to the force of gravity, it may be meaningful to introduce the sealing air at specifically this location, since the sealing air otherwise cannot expel liquid that has already penetrated. A further closeable drain line may likewise be present at such points.

A sealing air connection in the region of the distance sensor, preferably in the run-up cavity of the distance sensor, with particular advantage may be associated with the housing or the drainage housing. If the sealing air is introduced directly in the region of the distance sensor, liquid that still penetrates within the housing is thus more reliably kept from the distance sensor. This is advantageous in particular when the distance sensor itself is situated at a lowest point of the housing.

In one specific embodiment, the distance sensor may be an ultrasonic sensor. Ultrasonic sensors allow accurate position detection, but are less susceptible to slight soiling than optical sensors, for example, so that the former are particularly suited for the present application in which the distance sensor may definitely be wetted with liquid.

BRIEF DESCRIPTION OF THE DRAWINGS

The invention described above is explained in greater detail below with reference to one exemplary embodiment. In the figures.

DETAILED DESCRIPTION OF THE PREFERRED EMBODIMENTS

Figure 1:
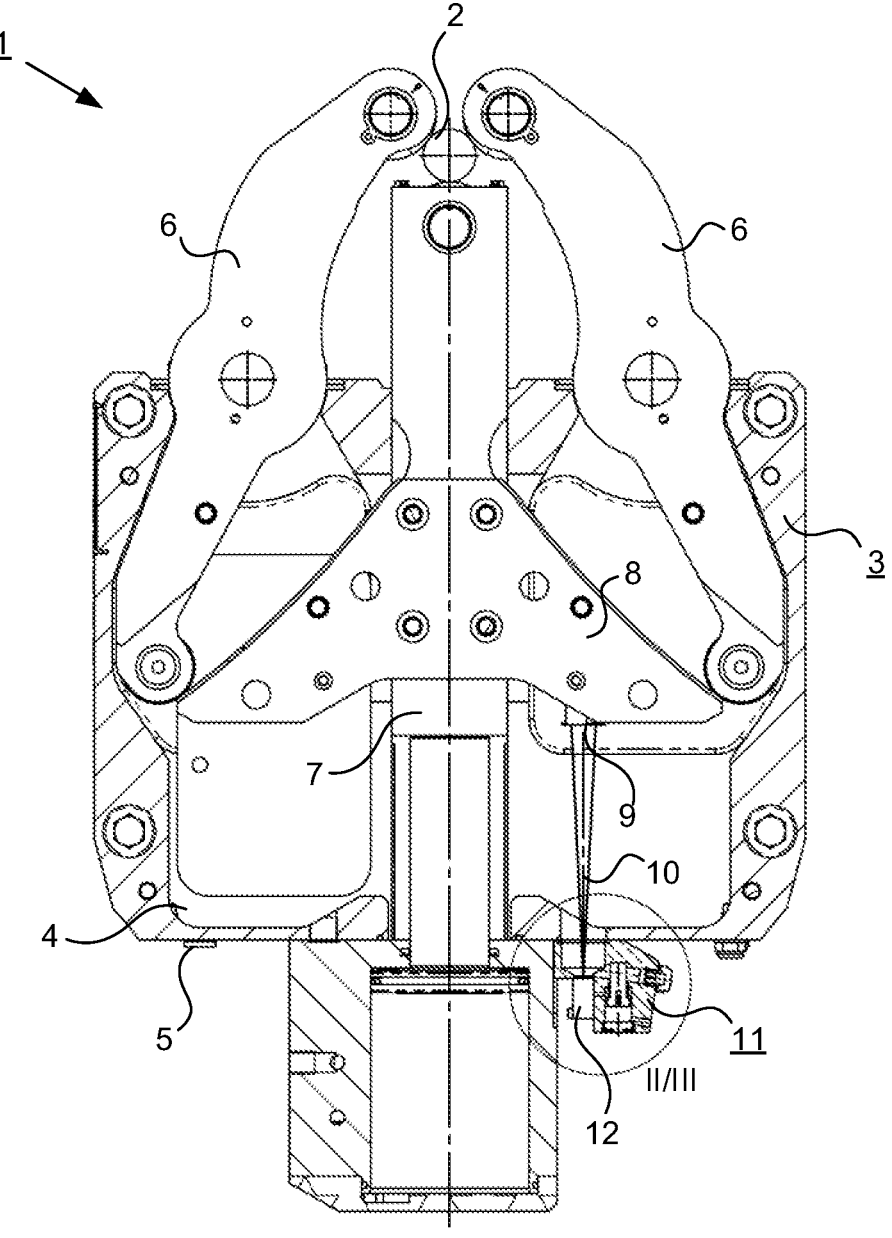
FIG. 1 shows a steady rest for holding workpieces, with an adjoining drainage housing in a lateral cross-sectional illustration.

FIG. 1 shows a steady rest 1 in which an actuating piston 7 is provided in order to actuate two laterally flanking angle levers 6 via a pressure element 8. The steady rest 1 is in a closed clamped state in which a workpiece 2 is fixed between the holding surfaces, formed by a holding element of the actuating piston 7, and the angle levers 6. To allow the clamping position of the steady rest 1 to be detected as a signal for a tool control, an ultrasonic sensor 12 is provided as a distance sensor, which detects a distance from a reflective surface 9 and thus allows a conclusion to be drawn concerning the position and the clamped state of the pressure element 8. After the pressure element 7 actuates the angle levers 6, the overall clamped state of the steady rest 1 may be deduced.

If the workpiece 2 is now machined in this position, liquid, for example from the use of cooling lubricant, may enter into the housing 3 which encloses the pressure element 8 as well as the lower areas of the angle levers 6 and the actuating piston 7. Since the ultrasonic sensor must be situated below the lowest deflection of the pressure element 8 in order to be able to detect any possible position of the pressure element 8, the penetrating liquid may collect in a run-up cavity 13 upstream from the ultrasonic sensor 12, and may thus skew the measured values of the ultrasonic sensor 12. Therefore, sealing air is introduced via a sealing air connection 5 into a housing cavity 4 that is formed by the housing 3, so that a positive pressure results in the housing 3. The penetration of liquid, at least during operation, may thus be largely, if not absolutely completely, avoided.

Figure 2:
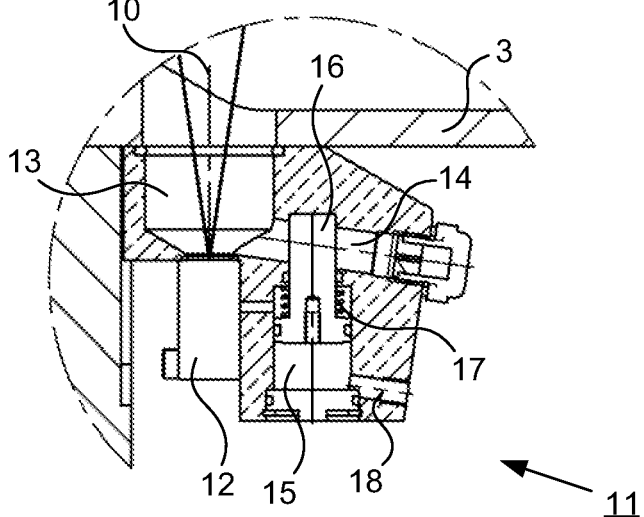
FIG. 2 shows the drainage housing as a detail of the steady rest illustrated in FIG. 1, in an operating state with the discharge valve closed.

In order to also remove liquid that still penetrates into the housing after the sealing air is switched off, a drainage housing 11, which in FIG. 2 is illustrated as an enlarged detail from FIG. 1, is mounted at the lowest point. The drainage housing opens into the housing 3 via a run-up cavity 13. The ultrasonic sensor 12 sends its distance signals 10 through the run-up cavity 13, and the reflections of the distance signals are intercepted by the ultrasonic sensor 12; via the time offset of the reflection it is possible to deduce the distance from the reflective surface 9 of the pressure element 8. A drain hole 14 with a downward slope extends from the run-up cavity 13 to the outside, the drain hole 14 being closed by a discharge valve 15. This represents the operating state in which, by introducing sealing air, a positive pressure between 0.5 and 1.0 bar is generated in the housing 3 and the penetration of liquid is thus avoided.

The discharge valve 15 thus prevents the sealing air from escaping. To ensure that the discharge valve 5 is always actuated in the operating state, the drainage housing 11 has a separate sealing air connection 18 that opens into the discharge valve 15 on the actuation side. The discharge valve 15 includes a blocking piston 16 which has a widening on the head side and which thus presses a compression spring 17 against a stop. Due to the introduction of the sealing air via the sealing air connection 18, the blocking piston is pushed into the drain hole 14, against the elastic force of the compression spring 17, and blocks the drain hole.

Figure 3:
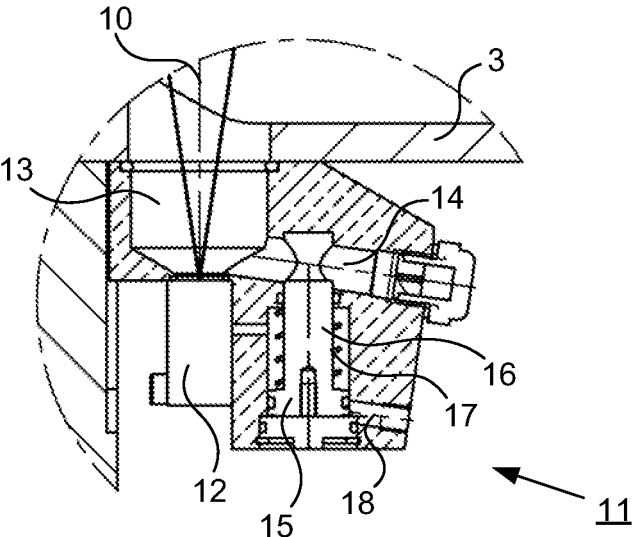
FIG. 3 shows the drainage housing according to FIG. 2 in an alternative rest state with the discharge valve open.

If a departure is to be made from the operating state, the sealing air is likewise discontinued, and pressure is no longer present at the sealing air connection 18. This rest state is shown in FIG. 3. Due to the elastic force of the compression spring 17, the blocking piston 16 is pressed out from the drain hole 14, and liquid entering the housing 3 may collect in the run-up cavity 13 which forms a sump, and may drain from the housing 3 via the drain hole 14.

The above discussion thus proposes a steady rest for holding a workpiece, which allows precise position detection but avoids damage and impairment from penetrating liquid to the greatest extent possible.

LIST OF REFERENCE NUMBERS

1 steady rest
2 workpiece
3 housing
4 housing cavity
5 sealing air connection of 3
6 angle lever
7 actuating piston
8 pressure element
9 reflective surface
10 distance signal
11 drainage housing
12 ultrasonic sensor
13 run-up cavity
14 drain hole
15 discharge valve
16 blocking piston
17 compression spring
18 sealing air connection of 11

What is claimed is:

1. A steady rest for holding a workpiece on a machine tool, comprising:

a perpendicularly movable actuating piston having a first angle lever disposed at a first side of the actuating piston and a second angle lever disposed at a second side of the actuating piston and which within a housing cooperates with the first angle lever and the second angle lever via a pressure element, a first sealing air connection coupled to the housing and operable to introduce sealing air into the housing to produce a positive pressure for avoiding penetration of liquid into the housing, a distance sensor disposed below a lowest movement position of the pressure element for detecting a position of the pressure element, and a drainage housing mounted at a lowest point of the housing and which opens into the housing via a run-up cavity for draining liquid from the housing via a drain hole that is closeable via a sealing air-actuated discharge valve.

2. The steady rest according to claim 1, wherein the distance sensor is oriented in parallel to the actuating piston, and the pressure element has a reflective surface, opposite from the distance sensor, for reflecting a distance signal emitted from the distance sensor.

3. The steady rest according to claim 1, wherein the discharge valve comprises a spring-actuated blocking piston, which in an unpressurized state opens up the drain hole.

4. The steady rest according to claim 3, wherein a second sealing air connection separate from the first sealing air connection is coupled to the blocking piston.

5. The steady rest according to claim 3, wherein the blocking piston is connected to a housing part that is acted on by sealing air.

6. The steady rest according to claim 1, wherein the distance sensor, the run-up cavity, the drain hole, and the discharge valve are accommodated in the drainage housing that is detachable from the housing.

7. The steady rest according to claim 1, wherein the first sealing air connection is disposed at a low point of a housing cavity formed in the housing.

8. The steady rest according to claim 1, wherein the first sealing air connection is coupled to the drainage housing.

9. The steady rest according to claim 1, wherein the distance sensor is an ultrasonic sensor.

* * * * *